Dec. 30, 1969  J. D. HORN  3,486,244
DEVICE FOR ILLUSTRATING BASIC MATHEMATICAL
PRINCIPLES, OPERATIONS, AND EQUATIONS
Filed June 19, 1967  2 Sheets-Sheet 1

John D. Horn
INVENTOR.

BY Hayden & Pravel
ATTORNEYS

Dec. 30, 1969     J. D. HORN     3,486,244
DEVICE FOR ILLUSTRATING BASIC MATHEMATICAL
PRINCIPLES, OPERATIONS, AND EQUATIONS
Filed June 19, 1967     2 Sheets-Sheet 2

John D. Horn
INVENTOR.

BY Hayden & Pravel

ATTORNEYS

United States Patent Office 3,486,244
Patented Dec. 30, 1969

3,486,244
DEVICE FOR ILLUSTRATING BASIC MATHEMATICAL PRINCIPLES, OPERATIONS, AND EQUATIONS
John D. Horn, Dallas, Tex., assignor to P & H Educational Aids, a partnership
Filed June 19, 1967, Ser. No. 646,948
Int. Cl. G09b 23/02, 19/02; G01g 1/22
U.S. Cl. 35—31                              5 Claims

ABSTRACT OF THE DISCLOSURE

A mechanical balance with graduated markings along the length of both balance arms and having hooks secured to the arm from which weights may be suspended.

BACKGROUND OF THE INVENTION

Field of the invention

The invention pertains to the field of teaching and in particular to aids used in teaching basic mathematical principles, operations, and equations.

Description of the prior art

The prior art discloses the concept of using a mechanical balance for solving certain equations and inequalities; however, the prior art devices known to applicant are relatively complex and have a rather limited field of application.

SUMMARY OF THE INVENTION

A simple mechanical balance is provided with markings along the balance arms, and hooks are provided on the arms below the markings. Weights are suspended from certain of the hooks on each arm and the resulting balance or inbalance of the balance arm is correlated with the marks from which the weights are hung to illustrate a desired mathematical concept. The markings may be changed as desired to increase the range of application of the teaching device.

The simplicity of construction and operation of the invention aids in direct understanding of the principles being illustrated. These same features make the invention usable by children with little or no assistance and also insure that the initial cost and subsequent maintenance of the invention are held to a minimum.

It is therefore an object of the present invention to provide a relatively simple instructional aid for use in illustrating certain mathematics principles.

DESCRIPTION OF THE PREFERRED EMBODIMENT

Figure 1:
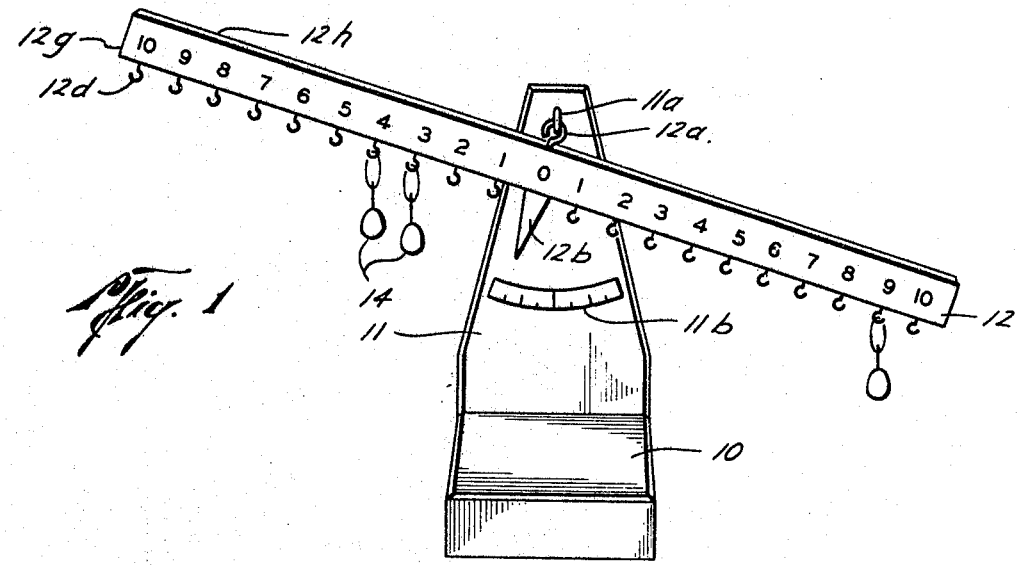
FIG. 1 is a front elevation of the apparatus of the present invention illustrating an unbalanced condition.
Figure 2:
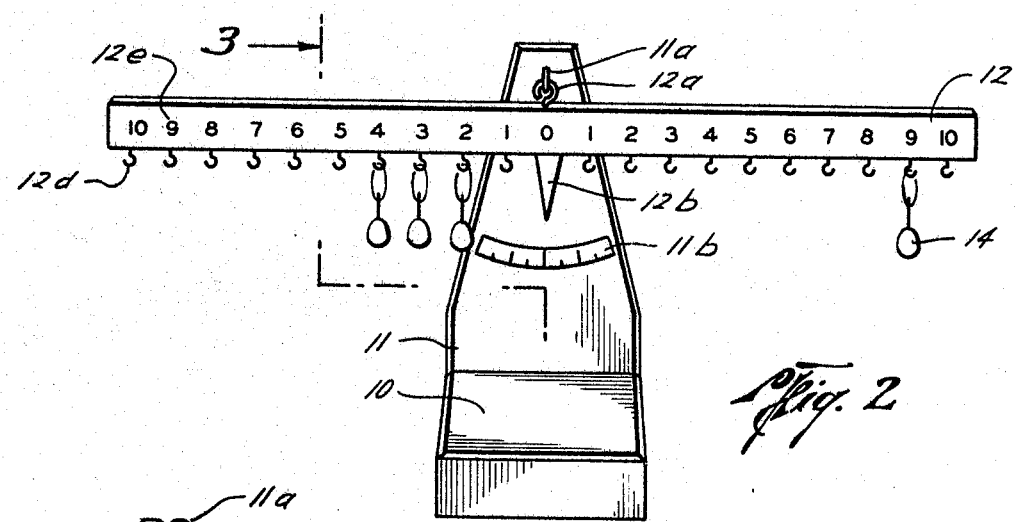
FIG. 2 illustrates the apparatus of FIG. 1 in a balanced condition.
Figure 3:
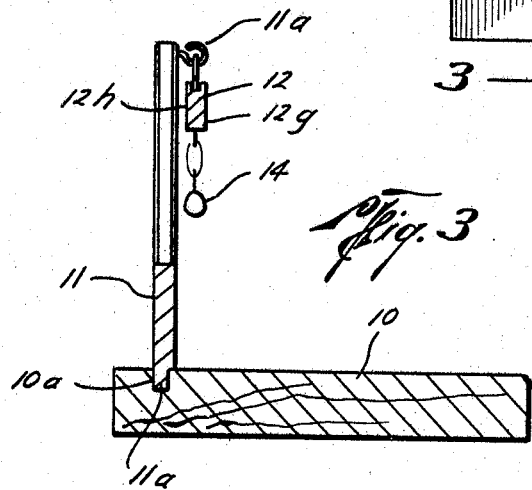
FIG. 3 is a vertical sectional view illustrating certain constructional aspects of the invention taken along the line 3—3 of FIG. 2.

Referring to FIGS. 1–3 of the drawings, it may be seen that the apparatus of the present invention includes a horizontal base 10, a vertical stand 11, and a balance arm or beam 12. The base 10, stand 11, and beam 12 may be formed from wood or any other suitable material. As best illustrated in FIG. 3 of the drawings, the base 10 is provided with a mortise 10a which receives a tenon 11a formed at the bottom of the stand 11. The mortise 10a and tenon 11a co-operate to form a relatively tight joint whereby the base 10 and stand 11 are frictionally secured to each other at a 90° angle. In the preferred embodiment, no cement or adhesive is employed in the joint so that the base 10 and stand 11 may be easily disassembled, although permanent fastening means such as adhesive may be employed if desired. The large dimensions and relatively heavy weight of the base assist in giving the assembled apparatus a stable footing.

As illustrated in the drawings, the vertical stand 11 carries a pivot 11a from which the beam 12 is freely suspended. The pivot 11a may be a metal hook or other suitable means which is affixed along the center line of the broad face of the stand 11. An arcuate scale 11b with graduated markings is provided at approximately the mid point of the stand 11 for a purpose to be hereinafter described.

Figure 5:
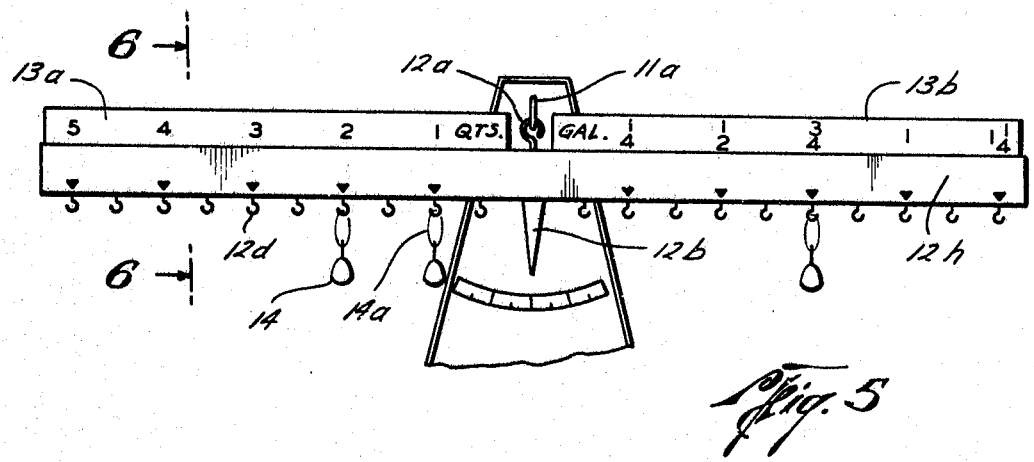
Figure 6:
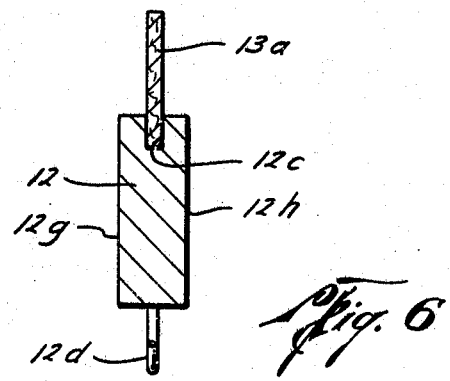
FIG. 6 is a vertical sectional view illustrating certain constructional aspects of the invention taken along the line 6—6 of FIG. 5.

As best illustrated by FIGS. 5 and 6 of the drawings, the balance arm 12 is a relatively long narrow beam with a metal eye hook 12a or other suitable means secured to the mid point of the top of the beam. The bottom edge of the beam 12 carries a pointer 12b of any suitable material which projects at a right angle from the mid point of the longitudinal axis of the beam 12. The upper edge of the beam 12 has a central slot 12c preferably formed along its entire length. The bottom edge of the beam 12 carries a plurality of equally spaced hooks 12d made of metal or other suitable material. The hooks 12d are equally spaced from each other and preferably are spaced in such a way that they are separated from any adjacent hook by an amount equal to the space between the vertical axis of the pointer 12b and the first hook next to the pointer.

Figure 4:
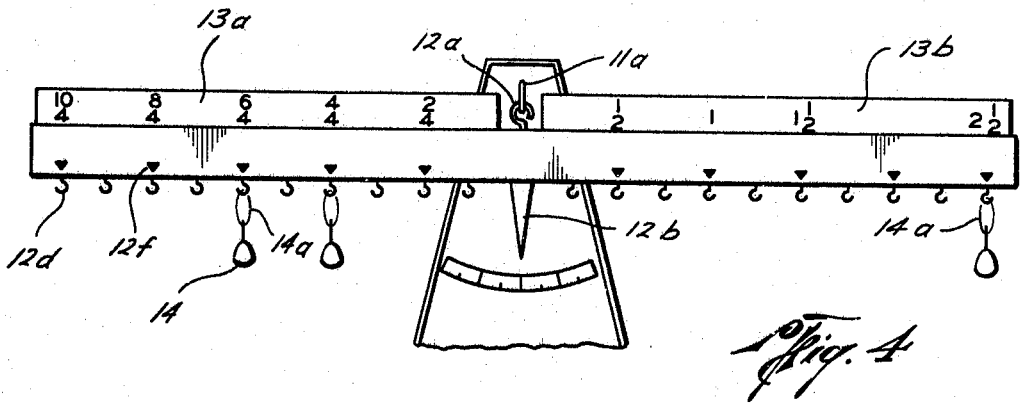
FIGS. 4 and 5 are partial front elevations of the apparatus of the present invention illustrating the use of different markings.

By comparing FIGS. 2 and 4 of the drawings, it may be seen that in the preferred form of the balance arm 12, one face 12g of the arm illustrated in FIG. 2 is marked off in graduations 12e of from 10 to 0 and 0 to 10 while the reverse face 12h of the same arm illustrated in FIG. 4 is marked only by small triangular markings 12f above every other hook 12d.

FIGS. 4–6 illustrate the use of alternative graduation or scale sets 13. The scale set 13a, 13b, as illustrated for example in FIG. 6 of the drawings, is disposed in the groove 12c formed in the upper edge of the beam 12. The scale set 13a, 13b may be constructed of wood, cardboard, plastic, or any other suitable material. The scale set 13a, 13b and its given markings may be changed by removing the set from its frictional engagement with the slot 12c and replacing it with another set having other desired markings.

As illustrated in FIG. 1 of the drawings, weights 14 having carrying loops 14a are removably suspended from certain of the hooks 12d. The weights 14 are all of equal weight and may be constructed of lead or other suitable material.

Certain basic mathematical principles, operations, and equations may be illustrated by the apparatus of the present invention. As illustrated in FIG. 1 of the drawings, weights 14 have been placed on the hooks 12d below the numbers 4 and 3 which appear to the left of the hook 12a and below the number 9 which appears to the right of the hook 12a. The pointer 12b does not line up with the center marking of the arcuate scale 11b indicating a condition of unbalance corresponding to an unbalanced equation. In FIG. 2 of the drawings, the balance of FIG. 1 is illustrated with an additional weight added to the hook corresponding to the number 2. As indicated by the alignment of the pointer 12b and the center mark of the arcuate scale 11b, the addition of the extra weight established a balance condition. The foregoing provides, for example, graphic illustration of the abstract proposition set forth by the equation:

$$4+3+2=9$$

FIGS. 4 and 5 of the drawings illustrate the use of the scale sets 13a, 13b. When using the scale sets 13a, 13b rather than the markings on the face 12g of the beam 12, the hook 12a is removed from the hook 11a and the beam 12 is reversed and resuspended from the hook 11a whereby the face 12h is at the front.

The scale set 13a, 13b illustrated in FIG. 4 graphically demonstrates the balanced equation:

$$6/4+4/4=2\tfrac{1}{2}$$

The scale set 13a, 13b illustrated in FIG. 5 of the drawings graphically demonstrates, for example, the balanced equation:

$$2 \text{ quarts} + 1 \text{ quart} = \tfrac{3}{4} \text{ gallon}$$

The triangular markings 12f indicate the weights 14 are to be suspended only from the indicated hooks. This requirement is imposed when the relationship between the left-hand scale set 13a and the right-hand scale set 13b is such that there is no marking corresponding to certain of the hooks. When the scale set 13a and 13b does have markings for every hook, weights may be suspended from any of the hooks without regard to the triangular markings 12f.

The markings 12f on the beam face 12h are preferably of the same color as the markings on the face of the scale set 13a and 13b while the markings 12e on the beam face 12g are preferably of a different color. This color coding avoids confusion by suggesting the use of the face 12h of the beam 12 when using the scale set 13a, 13b.

While only two examples of the possible markings on the scale set 13a and 13b have been given, it should now be apparent that any markings which may appear on either side of a balanced or unbalanced equation may be employed. By way of example rather than limitation, the following relationships may be set up on opposite sides of the scale sets: halves and fourths, quarts and gallons, pounds and ounces, hours and days, meters and centimeters, feet and yards. It is, of course, apparent that the apparatus of the present invention may also be employed to assist in teaching other concepts such as carrying in addition, supplying the missing addends to balance an equation, the decimal concept of place value, inequalities, selecting the proper operation to make an equation of given numbers balance, the one, zero commutative distributive and associative principles of addition and multiplication, subtraction, the inverse relationship of addition and subtraction and of multiplication and division, division with and without a remainder, factorization, composite and prime numbers, and others.

Many modifications may be made to the apparatus of the present invention. The triangular markings 12f may take some other shape and they may be disposed on the card sets 13a, 13b rather than on the beam 12 to indicate, for any given set, from which hooks 12d, the weights 14 may be suspended. The hooks 12d may be replaced with holes bored into the balance arm 12. The balance arm 12 may be pivoted about a pin or the like which passes through a hole in the arm 12 and into the stand 11 rather than being suspended by the hook 12a and pivot 11a. These and other modifications may be made without departing from the spirit and scope of the foregoing disclosure, and, accordingly, the invention is only to be limited by the claims appended hereto.

What is claimed is:

1. A device for illustrating basic mathematical principles, operations, and equations comprising:
    (a) a horizontally disposed base means for providing a stable footing for the device;
    (b) a substantially vertical stand secured to and projecting upwardly from and substantially perpendicular to said base means;
    (c) a balance arm having graduations disposed on a vertical face thereof at predetermined longitudinally spaced intervals and which are thereby visible to persons at a horizontal distance from the device;
    (d) pivot means on said stand and said balance arm for suspending said balance arm from said stand whereby said balance arm may pivot freely about said pivot means;
    (e) at least two equally spaced carrying means disposed along the lower edge of said balance arm on each side of said pivot means and disposed in relation to said graduation; and
    (f) a plurality of equal weights adapted to be removably and selectively carried by said carrying means to place said balance arm in a state of balance.

2. The device of claim 1, including: pointer means for indicating a state of balance or unbalance disposed at the center of said balance arm and scale means disposed on said stand for indicating the degree of imbalance.

3. The device of claim 1 wherein said graduations comprise scale set means for representing alternative markings or relationships in an equation; and holding means formed in said balance arm for removably holding said scale set means.

4. The device of claim 1 further including:
    (a) pointer means for indicating a state of balance or unbalance of the balance arm disposed at the center of said balance arm;
    (b) scale means disposed on said stand for indicating the degree of unbalance of the balance arm; and
    (c) said graduations comprising scale set means for representing alternative markings or relationships in an equation and holding means formed in said balance arm for removably holding said scale set means.

5. The device of claim 4 wherein:
    (a) said base means comprises a mortised block;
    (b) said stand includes a tenon which is removably mated with the mortise in said mortised block;
    (c) said pivot means comprises a metal hook;
    (d) said carrying means comprises, hooks disposed along the length of the lower edge of said balance arm;
    (e) each of said weight means comprises a lead body with a metal loop secured to said lead body for suspending said lead body from said carrying means;
    (f) said scale set means comprises two members having distinctive markings on their faces corresponding to a desired relationship between the two sides of an equation; and
    (g) said holding means comprises a slot formed along the upper edge of said balance arm for receiving said members of said scale set.

References Cited

UNITED STATES PATENTS 3,212,202   10/1965   Heinichen _____ 35—31

FOREIGN PATENTS 650,205   2/1951   Great Britain.

EUGENE R. CAPOZIO, Primary Examiner
WILLIAM H. GRIEB, Assistant Examiner

U.S. Cl. X.R.
177—193